Aug. 29, 1961  J. G. JOHNSTON  2,998,005
SOLAR HEATER
Filed March 20, 1958  2 Sheets-Sheet 1

John G. Johnston
INVENTOR.

BY *Clarence A. O'Brien*
*and Harvey B. Jackson*
Attorneys

Aug. 29, 1961  J. G. JOHNSTON  2,998,005
SOLAR HEATER
Filed March 20, 1958  2 Sheets-Sheet 2
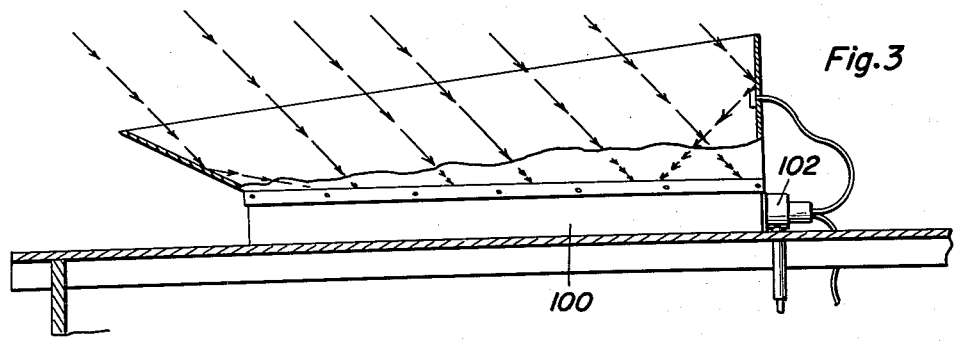
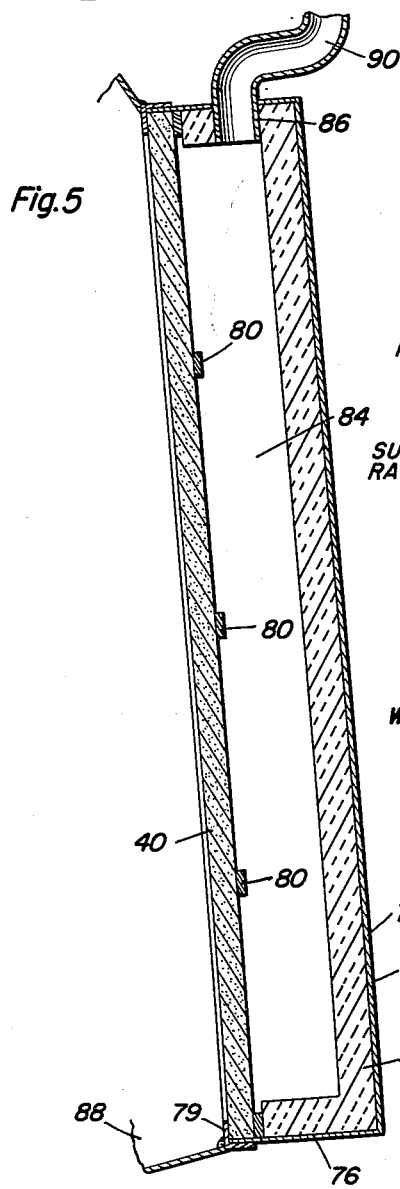
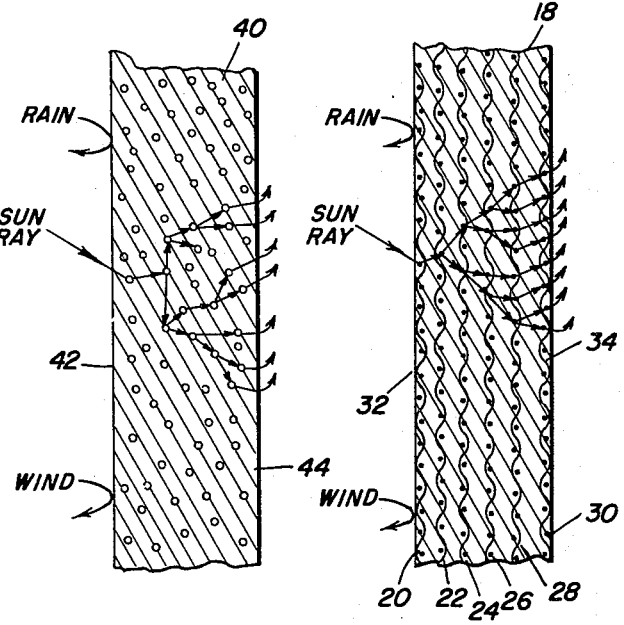
John G. Johnston
INVENTOR.

United States Patent Office  2,998,005
Patented Aug. 29, 1961

2,998,005
SOLAR HEATER
John G. Johnston, Rte. 3, Box 84A, Palmdale, Calif.
Filed Mar. 20, 1958, Ser. No. 722,727
8 Claims. (Cl. 126—270)

This invention relates to heating plants and more particularly to solar heaters.

The value of the sun's energy is known to be tremendous. The efficient capture of this energy is certainly well worthwhile.

The principal purpose of this invention is to provide means for efficiently utilizing some of this energy by extracting it in the form of heat. This heat may be used for any purpose such as; heating buildings, heating water or other liquids, chemicals or solids for any purpose, to use the heat in refrigeration or cooling equipment, use the heat for dehumidifying, etc. In the use of this invention for heating occupied buildings it will be noted that the air is heated in the direct presence of sunlight (not through glass or some other transparency), and the air is reduced in germ and bacteria count due to the ultraviolet in direct sunlight. Health advantages are understandable in view of this and moreover, this invention is so constructed that the air in a building is constantly replaced by heated, outside and germ reduced air.

This invention briefly consists in a shallow open-faced case which is insulated throughout and covered with a sunlight-to-heat exchanger face which is preferably in the form of a porous fiber network. This network is of considerable importance in the invention because it has a special action in connection with the extracting of heat from the sun's energy.

It is preferred that the network be formed of glass fibrous material, such as, "Fiberglas," glass wool and others. The sun's rays penetrate into the network striking an inner fiber thereby releasing some energy, and reflecting the rest of the energy to some other fiber farther into the network where additional radiant energy is released in the form of heat, then continuing to additional deeper fibers until the balance of the energy is released and changed to heat. The heated air rises inside the case and forms a draft that promotes continual flow of heated air. The heat released within the network is well protected from being dissipated to the cold outside air and wind currents due to the nature of the fibrous network itself. It is a wind and rain barrier.

Sun's rays will penetrate the fibrous network or mat at any angle without reflecting back into the outer air as in the case of a glass covered heater. This is one main advantage of the fibrous mat. The second main advantage is the conversion of sunlight to heat within the mat where the heat is insulated from radiation to the outside.

To promote efficient extraction of heat, it is preferred that the fibers be painted black or some other very dark color. Moreover, the internal construction of the mat can be varied. It can be one piece or it can be laminated, the latter being slightly superior. The laminations can have a slight space between them with the outermost layer or layers light colored or reflective (refractive in the mat). The innermost layers are black and therefore, absorptive of radiant energy and heat. In the laminar construction, rays strike the outermost meshes and reflect and refract farther toward the inner fibers of the mat before changing to heat. In this way some energy will be saved by preventing backward heat radiation to air currents at the outer fibers of the mat. One of the greater advantages in this type of construction is that it is more durable and resists the inclement weathers, such as rain or snow.

This invention can be applied to any buildings and at various angles. The means of mounting the mat and its box can be varied from the simplest to very complex arrangements with mirrors, reflective surfaces, tilt adjusting mechanisms, blowers that are thermostatically controlled and with the inclusion of many other available attachments. Moreover, the embodiments of this invention can be applied to a top of a building, side or can be at a position remote from the building with the heated air piped into the building. There are many other alternatives, modifications and changes which will occur in following the description of the illustrated forms of the invention.

FIGURE 3 is a side view, parts being shown in section, of another embodiment of the invention;

FIGURE 4 is an enlarged sectional view taken on the line 4—4 of FIGURE 2 and showing the laminar mat used in the invention;

FIGURE 5 is an enlarged sectional view showing a very simplified version of the invention; and FIGURE 6 is a fragmentary enlarged sectional view showing an energy absorbing and converting mat.

Figure 1:
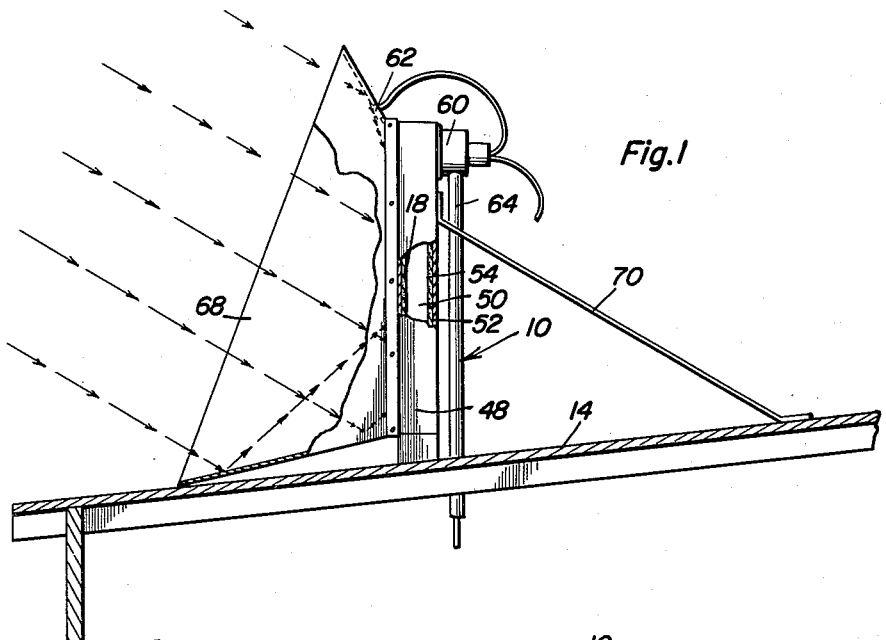
FIGURE 1 is a side view of one embodiment of the invention.
Figure 2:
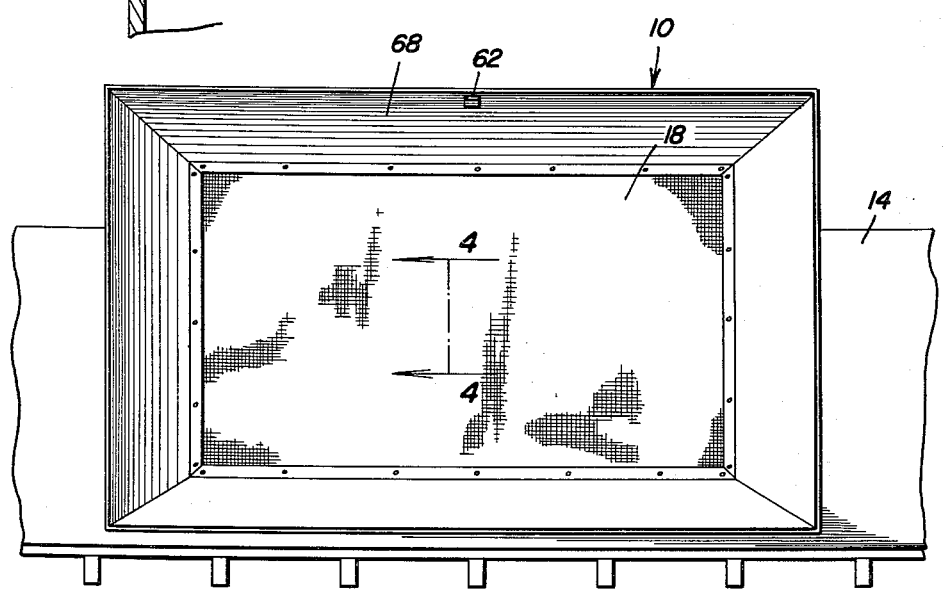
FIGURE 2 is a front view of the embodiment in FIGURE 1.

In the accompanying drawings FIGURES 1 and 2 show a typical installation with solar heater 10 mounted on the top of a sloped roof 14 of a building. This heater has a fibrous network or mat 18 in it. The mat is made of screens of expanded fibrous material whose distance between parallel fibers or particles is great in comparison to the diameter or thickness of the solid elements themselves. Although fibrous materials are referred to herein, inasmuch as fibrous materials that serve the purpose of the invention very well are readily commercially available, it is to be understood that the expression "fiber" does not exclude particles of other shapes and configurations.

Mat 18 is laminar having screens or layers 20, 22, 24, 26, 28 and 30 that may be very slightly spaced from each other and that are made in mesh formation. All of the mat fibers are colored black. The laminated mesh construction using a material such as glass cloth mesh is more durable than the fibrous glass mat to be considered below, although not necessarily more efficient as a heat panel. In utilization, the energy rays from the sun pass the front surface 32 and strike the solid elements of the various layers and accordingly surrender a portion of their energy as heat. It will be realized that the rays which do not strike the outermost layers continue inwardly so as to strike the inner layers to surrender their energy.

As a modification, the outer layers 20 and 22, for example, may be made reflective by dyeing or painting white or silver colored. The sun's rays striking the silvered strands will be reflected toward fibers of the inner layers of the mat 18 (FIGURE 4) before being converted to heat by striking the dark strands. This enables the layers 20 and 22 to act as insulation against cold outside eddying air.

Mat 40 shows a modification. The mat has a front face 42 and a rear surface or face 44. The solid elements of the mats are dyed black throughout. The action of the rain and wind and radiant energy of the sun rays is the same as that of FIGURE 4 as shown by the arrows in FIGURE 6.

Reference is now made again to the solar heater 10. It consists of a box 48 that has four side walls and a back wall. The side walls and back wall are covered with insulation (see FIGURE 1) and the mat 18 is held parallel to the back wall of the box or case. Heater air chamber 50 is between the rear surface of mat 18 and the front surface of the insulation 52 on the back wall 54 of case 48.

A blower 60 is attached to the back wall of the case and has its inlet in registry with chamber 50. The blower can be wired with a thermostat located in the building or it can be merely a manual on-off arrangement. When a thermostat is used in the building, the sensing element 62 thereof is located adjacent to the mat 18 to sense the presence of sunlight which will, through the unshown circuitry, require the blower motor to be energized. The discharge port of the blower has a conduit 64 connected with it and this exhausts in the building.

Hood 68 is attached to case 48 and is around the edges of the mat 18. The purpose of the hood is to receive the sun's energy and reflect it onto the fibers of mat 18. In addition, the hood functions as a protector for the mat 18.

Any means may be resorted to for mounting the solar unit 10 and it may be mounted in any place. The illustration shows an ordinary mounting bracket 70 which is attached to the case and to the building roof 14. Although non-adjustable, the bracket 70 could be substituted by conventional adjustable brackets.

Reference is now made to FIGURE 5. In this embodiment of the invention the details for mounting mat 40 are shown. These details are applied to all embodiments of the invention. The mat 40 is mounted in case 74, the latter having a back wall 75 and side walls 76. An insulating liner 77 is in the case 74. Mat 40 has a frame 79 around its perimeter and this frame is secured to the open front of case 74. Transverse battens 80 across opposing side walls of case 74 and hold the frame 79 and its mat 40 supported parallel to the back wall 75 of the case and spaced from the insulation 77 therein. This forms chamber 84 within which air is heated and conducted to an outlet 86. Hood 88 is attached to the frame 79 and/or the case 74 and serves as a protector as well as a heat reflector as shown in FIGURE 1.

Outlet 86 has a pipe, conduit or the like 90 registered with it through which heated air is adapted to be moved. The heated air of chamber 84 can be drawn through the conduit 90 or can be moved through the conduit by convection. In the case of a convection motion, it is preferred that the case be tilted slightly as shown in FIGURE 5 because this will promote more efficient upward draft to pass through the conduit 90.

In this invention, air is introduced into the heated air chamber by producing a flow of air transversely through the porous fiber mat or network, which results in heating the air by heat exchange with the heat absorbtive fibers of the porous network.

FIGURE 3 shows that the solar heater 100 can be mounted flat. Air can be drawn through and heated by the unit in any position from vertical to horizontal. Here again, this embodiment as well as all others, can be mounted for adjustment by the use of adjustable mounting brackets. Secondly, complex and elaborate parabolic or flat mirrors can be used to attain more of the sun's rays energy or the simpler versions can be used. The mat may have its fibers less dense in the front part thereof and more dense in its rear part to achieve a graduated recovery of heat from the energy rays as they penetrate the mat. All such embodiments fall within the scope of the invention as claimed and all other embodiments as fall within the scope of the following claims may be adopted.

What is claimed as new is as follows:

1. In a solar heater, the combination of a case which has a closed heated air chamber therein and means through which the heated air is adapted to be taken therefrom, the improvement comprising a heat recovery mat of loosely woven fibers in registry with said chamber, means for mounting said case on a supporting surface, means for producing a flow of air transversely through said mat into said heated air chamber, and means for withdrawing heated air from said chamber to a point of use including a blower controlled by a sun energized thermostat.

2. In a solar heater, the combination of a case which has impervious walls and an impervious back wall, a porous network of fibers carried by said case and adapted to be exposed directly to the sun and defining spaces therebetween substantially larger than the diameter of said fibers, said network spaced from said back wall and attached to said side walls to form a closed heated air chamber, and means for producing a flow of air transversely through said network into said heated air chamber and thence from said chamber to a point of use.

3. The combination of claim 2 wherein all of said fibers forming said network are dark colored.

4. The combination of claim 2 wherein the fibers of said network adjacent said defined chamber are darker in color than the fibers spaced further from said chamber.

5. The combination of claim 2 wherein the fibers of said network adjacent said defined chamber are dark in color and the fibers remote from said chamber are light in color.

6. The combination of claim 2 wherein the density of said fiber network is greater adjacent said chamber than remote from said chamber.

7. The combination of claim 2 wherein said network includes a plurality of layers, each of said layers being of mesh formation.

8. The combination of claim 2 wherein said network of fibers comprises a loose mat of expanded fibrous materials, said portion of the mat remote from said chamber providing a barrier for wind and rain and permitting sun rays to penetrate the mat and strike fibers closer to said chamber for surrendering radiant energy in the form of heat.

References Cited in the file of this patent

UNITED STATES PATENTS

| | | |
|---|---|---|
| 1,158,175 | Cherrier | Oct. 26, 1915 |
| 2,484,127 | Stelzer | Oct. 11, 1949 |
| 2,580,555 | Kroeger | Jan. 1, 1952 |
| 2,822,799 | Sterick | Feb. 11, 1958 |